United States Patent
Yarkosky et al.

(10) Patent No.: US 7,206,593 B1
(45) Date of Patent: Apr. 17, 2007

(54) METHOD FOR PROVIDING DIFFERING SERVICE LEVELS IN A WIRELESS TELECOMMUNICATIONS NETWORK

(75) Inventors: Mark Yarkosky, Overland Park, KS (US); Alex Zhang, Overland Park, KS (US); Von McConnell, Leawood, KS (US); Manish Mangal, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 582 days.

(21) Appl. No.: 10/116,456

(22) Filed: Apr. 4, 2002

(51) Int. Cl.
*H04B 7/00* (2006.01)
*H04Q 7/20* (2006.01)

(52) U.S. Cl. .................. 455/517; 455/436; 455/440; 455/453; 455/527

(58) Field of Classification Search ........ 455/517–520, 455/507, 500, 527, 426.1, 436, 438, 440, 455/453
See application file for complete search history.

(56) References Cited

U.S. PATENT DOCUMENTS

| | | | |
|---|---|---|---|
| 4,870,408 A | 9/1989 | Zdunek et al. | |
| 5,179,374 A | 1/1993 | Winger | 340/825.06 |
| 5,371,780 A | 12/1994 | Amitay | 379/58 |
| 5,442,634 A | 8/1995 | Cizek | 370/95.1 |
| 5,442,809 A | 8/1995 | Diaz et al. | |
| 5,500,889 A | 3/1996 | Baker et al. | 379/67 |
| 5,570,411 A | 10/1996 | Sicher | 379/57 |
| 5,574,977 A | 11/1996 | Joseph et al. | 455/58.1 |
| 5,615,249 A | 3/1997 | Solondz | 379/58 |
| 5,752,193 A | 5/1998 | Scholefield et al. | 455/452 |
| 5,790,955 A | 8/1998 | Tomoike | |
| 5,812,656 A | 9/1998 | Garland et al. | 379/208 |
| 5,850,611 A | 12/1998 | Krebs | |
| 6,032,051 A | 2/2000 | Hall et al. | |
| 6,061,559 A | 5/2000 | Eriksson et al. | 455/414 |
| 6,067,457 A | 5/2000 | Erickson et al. | 455/512 |
| 6,070,192 A * | 5/2000 | Holt et al. | 709/227 |
| 6,112,101 A | 8/2000 | Bhatia et al. | 455/512 |
| 6,119,017 A | 9/2000 | Cassidy et al. | |
| 6,192,248 B1 | 2/2001 | Solondz | 455/450 |
| 6,226,277 B1 | 5/2001 | Chuah | |
| 6,240,287 B1 | 5/2001 | Cheng et al. | |

(Continued)

OTHER PUBLICATIONS

U.S. Appl. No. 10/002,805, filed Dec. 3, 2001 entitled "Method and System for Zone-Based Capacity Control".

(Continued)

*Primary Examiner*—Edan Orgad

(57) ABSTRACT

A mobile station in a wireless network can be assigned a priority level. The wireless network may support two or more different priority levels. A mobile station's priority level may be stored in a database containing other identifiers, such as the mobile station's electronic serial number and mobile identification number. The priority level can be stored as a part of a profile in the home location register or in a visitor location register. When the mobile station attempt to access the wireless network, the access request can be serviced based on the priority of the mobile station. The access request may also be serviced based on a current usage status of the wireless telecommunications network. Mobile stations with higher priorities may receive a preference for access to the wireless network's resources. Mobile stations with lower priorities may be disconnected from the wireless network to accommodate a higher priority mobile station.

13 Claims, 6 Drawing Sheets

U.S. PATENT DOCUMENTS

| | | |
|---|---|---|
| 6,243,586 B1 * | 6/2001 | McGuire ................. 455/452.1 |
| 6,282,429 B1 | 8/2001 | Baiyor et al. ................ 455/512 |
| 6,292,671 B1 | 9/2001 | Mansour ..................... 455/518 |
| 6,324,399 B1 | 11/2001 | Salmivalli .................... 455/433 |
| 6,381,467 B1 | 4/2002 | Hill et al. |
| 6,477,150 B1 | 11/2002 | Maggenti et al. |
| 6,490,452 B1 | 12/2002 | Boscovic et al. |
| 6,600,928 B1 * | 7/2003 | Ahya et al. ................. 455/518 |
| 6,618,597 B1 | 9/2003 | Choi |
| 6,725,052 B1 * | 4/2004 | Raith .......................... 455/518 |
| 6,882,850 B2 * | 4/2005 | McConnell et al. ......... 455/453 |
| 2002/0024943 A1 | 2/2002 | Karaul et al. |
| 2002/0107000 A1 | 8/2002 | Goss et al. ................. 455/405 |
| 2003/0078042 A1 * | 4/2003 | Miriyala et al. ............ 455/435 |
| 2003/0087653 A1 | 5/2003 | Leung et al. |
| 2003/0125022 A1 * | 7/2003 | Blossom et al. ............ 455/426 |
| 2006/0099981 A1 * | 5/2006 | McKenna et al. .......... 455/508 |

OTHER PUBLICATIONS

Office Action from U.S. Appl. No. 10/002,805, filed Jun. 10, 2004.
International Search Report from International Application No. PCT/US02/31411, dated Mar. 4, 2003.

* cited by examiner

METHOD FOR PROVIDING DIFFERING SERVICE LEVELS IN A WIRELESS TELECOMMUNICATIONS NETWORK

FIELD OF THE INVENTION

The present invention relates generally to wireless communications networks. More specifically, it relates to a method for providing different levels of service in a wireless communications network.

BACKGROUND OF THE INVENTION

As part of the process by which a user subscribes to a wireless service provider, the user typically selects one of a variety of service plans that may, for example, specify the rates charged for accessing the network and the types of services available. The service provider then typically enters the user's information into a database of authorized users, which the network may use to determine whether a given user is authorized to use the network.

Thus, when a user attempts to access the wireless network, such as by communicating with one of the wireless provider's base stations, the network typically engages in an authentication procedure that involves querying the database of authorized users. If the user is authorized to access the network, and if network has the available capacity, the connection is normally established, i.e., the network typically shows no preference between authorized users during the connection process. If the user is authorized and the capacity exists, the user is connected. If the user is authorized and the capacity does not exist, then the user is not connected.

While this approach is relatively simple, certain drawbacks remain. For example, wireless networks are limited in capacity by the number of base stations they support, and the range of the base stations. Due to this limited capacity, users may have difficulty accessing some areas of a given wireless network during peak times. Although wireless service providers often attempt to increase the range and capacity of their networks by building new base stations or by acquiring an existing company's base stations, this solution can be substantially expensive.

As another drawback, immediate access to the network at all times may be more important to some subscribers than to others. For instance, some users may be willing to pay more to access the network in peak usage times, while other users would rather pay a lower price and have the use restricted during peak usage times. Similarly, some users may want to access the entire network and pay a higher price, while other users may only wish to access a smaller portion of the network and pay a lower price.

Therefore, there is a need to provide ways to use the limited capacity of wireless networks more efficiently and to accommodate the different needs of different subscribers.

SUMMARY OF THE INVENTION

In a first principal aspect, the present invention provides a method for providing a specialized service level in a wireless telecommunications network. Mobile stations can subscribe to the wireless telecommunications network. A predetermined group of mobile stations that are a subset of the mobile stations subscribing to the wireless telecommunications network may be defined. A call request to set up a call involving a given mobile station in the predetermined group of mobile stations may be received. The given mobile station may operate in a current service area in which an active number of mobile stations in the predetermined group are currently involved in calls. The current service area of the given mobile station may be determined, and which of the active number of mobile stations in the predetermined group are currently involved in calls may also be determined. The call request may be allowed if the active number is less than a predetermined maximum number.

In another principal aspect, the present invention provides a system for providing a specialized service level to a predetermined group of mobile stations, where the predetermined group of mobile stations may be a subset of mobile stations subscribing to a wireless telecommunications network. A database may include call activity data, which can specify how many mobile stations in the predetermined group of mobile stations are currently involved in calls in each service area in the wireless telecommunications network. A call connection system may connect calls in the wireless telecommunications network. A call control system may control the call connection system, and the call control system may control, based at least in part on the call activity data in the database, the use of resources of the wireless telecommunications network by the mobile stations in the predetermined group of mobile stations.

In another principal aspect, the present invention provides a method of implementing quality of service levels in a wireless telecommunications network. An access request may be received from a requesting mobile station to access the wireless network. The requesting mobile station may be authenticated to determine if the requesting mobile station is an authorized user of the wireless network. A requesting mobile station priority level may be determined. The access request may be processed, and the priority level may be used, at least in part, to determine whether to grant the access request.

In yet another principal aspect, the present invention provides a method for implementing quality of service levels during a handoff. A handoff request may be received from a mobile station to handoff from a first area to a second area. A priority of the mobile station may be determined, and the priority may define a subset of mobile stations allowed to access the second area. An active number of mobile stations in the second area having the priority may be determined. The handoff request may be allowed if the active number is less than a predetermined number.

These as well as other aspects and advantages of the present invention will become apparent from reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

A. Exemplary Architecture

Figure 1:
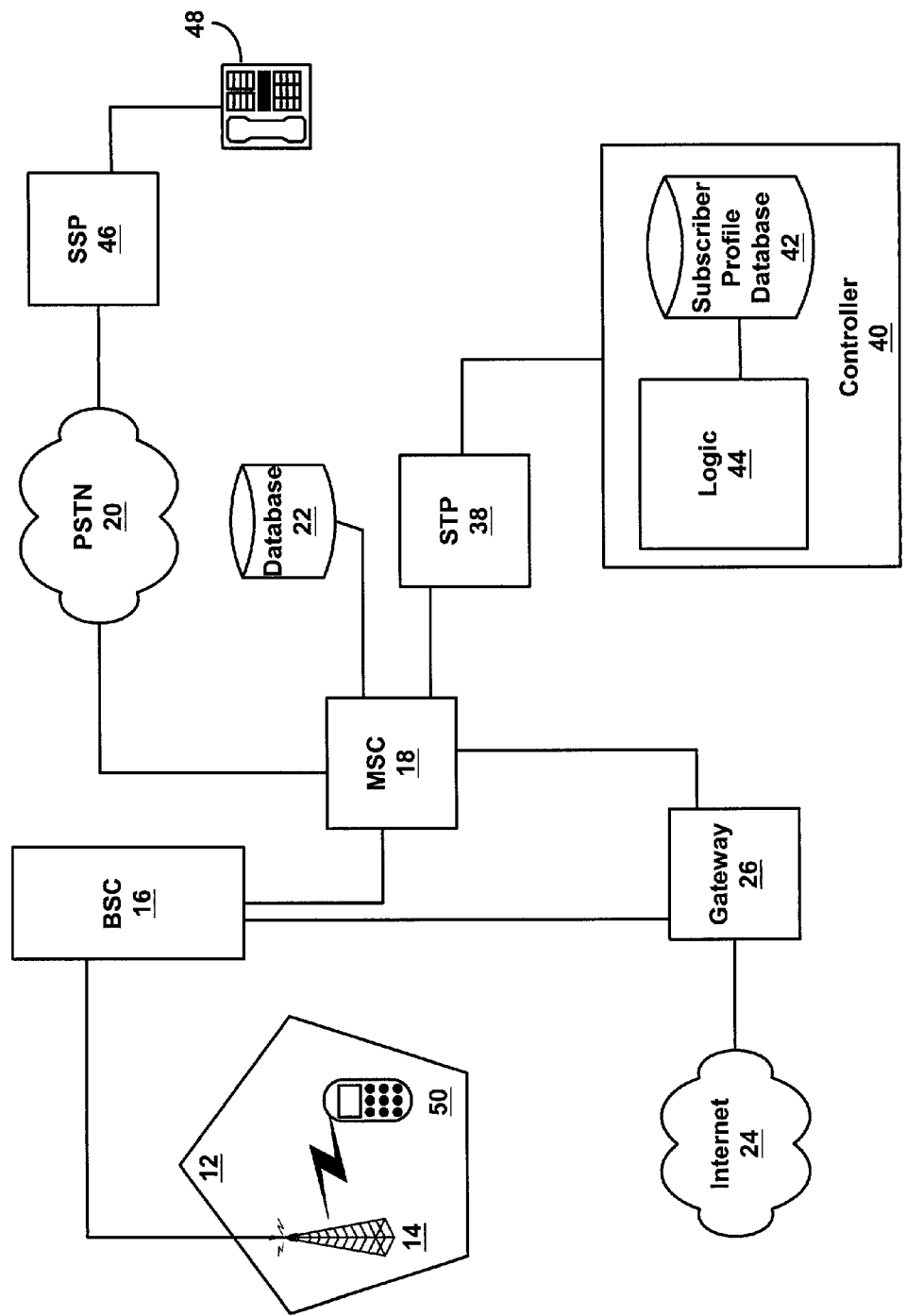
FIG. 1 is a block diagram of a wireless telecommunications network.

FIG. 1 is a block diagram illustrating components of an exemplary wireless telecommunications network 10 ("wireless network"). The wireless network 10 includes multiple geographical regions, known as cells 12. A cell 12 contains a base transceiver station 14 ("base station"), which is usually located within the cell 12. The base station 14 is able to communicate over an air interface with a mobile station 50 also located within the cell 12. A mobile station 50 may be any device capable of communicating with the base station 14, including a cellular phone, a mobile phone, a personal digital assistant ("PDA"), a wireless Internet appliance, or another device. Additionally, the cell 12 can contain more that one mobile station 50.

Many different methods of communication may be used between the mobile station 50 and the base station 14. Time Division Multiple Access ("TDMA") is one popular method for wireless communications. In TDMA systems, the base station 14 typically communicates on a group of frequencies, and each frequency may itself carry at least one multiplexed call. Another popular format is Code Division Multiple Access ("CDMA"). In a CDMA system, by comparison, each base station 14 communicates over a spread spectrum of frequencies, and the spectrum may carry many multiplexed calls. In a preferred embodiment, the cellular wireless system 10 is a CDMA system. Typical components for CDMA systems include those described in the Telecommunications Industry Association ("TIA") standard, ANSI/TIA/EIA-95-B-99, dated Feb. 3, 1999, which is incorporated herein by reference in its entirety. The Global System for Mobile Communications ("GSM"), another digital format, or an analog format may also be used.

The base station 14 connects to a base station controller 16 ("BSC"), which, in turn, is connected to a mobile switching center 18 ("MSC"). The MSC 18 connects calls between the public switched telephone network 20 ("PSTN") and the cell 12. The MSC 18 also maintains a database 22 that stores customer and system information. While FIG. 1 shows one database 22, the MSC 18 can connect to more than one database. The database 22 may be separate from the MSC 18, as shown in FIG. 1, or it may be integrated into the MSC 18. The MSC's 18 tasks include authenticating and registering mobile stations 50 on the wireless network 10 and processing account information for users.

The MSC 18 may also provide connectivity to the Internet 24 through a gateway 26. As is known in the art, a gateway can be used to connect two different networks. By connecting to the Internet 24, the mobile station 50 and a remote host computer (not shown) that is globally accessible via the Internet 24 can exchange data. The BSC 16 may also connect to the gateway 26, which can serve as a packet data serving node ("PDSN"). The gateway 26 may in turn provide connectivity to a packet-switched network, such as the Internet 24 or another network.

The MSC 30 may be coupled with a signaling system, represented by a signal transfer point ("STP") 38. The STP 38 may in turn be coupled with a controller 40 such as a home location register ("HLR") and/or a service control point ("SCP"). The controller 40 may maintain or otherwise have access to a subscriber profile database 42. While FIG. 1 depicts the subscriber profile database 42 as an integrated part of the controller 40, it may also be separate from the controller 40. The STP 38 may connect to more than one controller 40, and the controller 40 connected to the STP 38 may each perform different functions.

The controller 40 can include a subscriber profile database 42. The subscriber profile database 42 can define services, attributes, locations and states of subscribers and mobile stations 50. For instance, it may operate as a HLR and store profiles of subscribers and mobile stations 50 in a specified "home" area. The subscriber profile database 42 may store the information in a variety of different formats, and it may be constructed using a variety of different implementations. A logic element 44 interfaces with the subscriber profile database 42. The logic element 44 may further contain a processor and memory. The processor and memory allow the logic element 44 to run software code and to access and search the subscriber profile database 42.

The mobile station 50 operating in the cell 12 communicates with the base station 14 in that cell 12. Generally, each mobile station 50 operating in the wireless network 10 is uniquely identified, thereby allowing accurate authentication, call routing, billing and other services. The mobile station 50 is ordinarily uniquely identified using a combination of two identifiers; however, other ways may also be used. The first identifier is an electronic serial number ("ESN"), which is hard-coded into the mobile station 50 and initially activated by a service provider. The ESN is typically unique for the mobile station 50. It may be a 32-bit binary number containing three parts. The three parts are the manufacturer code, a reserved area and a manufacturer-assigned serial number.

The ESN is coupled with a second identifier, a mobile identification number ("MIN"). The MIN is a 24-bit number, which generally corresponds to the phone number assigned to the mobile station 50. It is used for both billing and receiving calls. The MIN may be changed in order to account for changes in ownership of the mobile station 50, a change in the mobile station's phone number or other changes. When a call is placed, the ESN and the MIN are used to verify the service parameters, such as the subscriber profile store, for the mobile station 50. For instance, they may confirm that the mobile station 50 is authorized to access the wireless network 10, thereby preventing a mobile station 50 that is not paying for service from connecting to the wireless network 10.

When the mobile station 50 is first powered on or moves into the cell 12 defined by the base station 14, the mobile station 50 sends a system access or registration message via the air interface to the base station 14. The message carries a parameter that identifies the mobile station's ESN and MIN. The message may pass from the base station 14 to the BSC 16 and in turn to the MSC 18. The MSC 18 may then forward the message via the signaling system 38 to the controller 40, while also identifying the location (e.g., the identity of the MSC 18) where the mobile station 50 is operating. The controller 40 then responsively validates the mobile station 50, for instance, by ensuring that the MIN and ESN are listed together in the subscriber profile database 42. The validation may be done using a variety of different methods. One method for validating a mobile station 50 using its ESN and MIN numbers is described in IS-41, which is incorporated herein by reference in its entirety.

The controller 40 may additionally set a flag in the subscriber profile database 42 for that MIN to indicate that the mobile station 50 is operating in the location indicated. The controller 40 may also send a local version of the mobile station's subscriber profile via the signaling system to the MSC 18 to be stored in a visitor location register ("VLR"). The VLR may be stored separately from the MSC 18, for instance in the database 22, or it may be integrated into the MSC 18. The VLR is generally used to store profile information of a mobile station 50 that roams out of its home area.

When a mobile station 50 communicates with a base station 14 outside its home area, the MSC 18 corresponding to the current base station 14 ordinarily doesn't have information about the roaming mobile station 50. In order to verify that the roaming mobile station 50 has permission to access the wireless network, 10 and to enable other features, the wireless network 10 queries the mobile station's HLR. The HLR responds by sending a profile for the mobile station 50 back to the MSC 18, which then stores the profile in its VLR. While the mobile station 50 is active in the remote area, the VLR profile allows accurate authentication of the mobile station 50.

When the mobile station 50 seeks to originate a call to a directory number on the PSTN, the mobile station 50 conventionally sends an origination message via an air interface to the base station 14. The message in turn passes to the BSC 16 and then to the MSC 18. The origination message ordinarily carries a parameter identifying the mobile station's ESN and MIN. When the MSC 18 receives the message, it validates the request by reference to the local subscriber profile for the MIN, as provided by the controller 40. For instance the controller 40 may store the HLR containing the mobile station's profile. Alternatively, it may send an origination-request message via the signaling system to the controller 40, and the controller 40 may validate the request by reference to the subscriber profile for the MIN and then notify the MSC 18 of the successful validation. The MSC 18, the controller 40 or both may also apply various supplemental services, such as number translation or call blocking. Other supplemental services may also be supplied.

With successful validation, the MSC 18 then sets up the call to the directory number via the PSTN 20. Usually this is performed using industry standard ISUP signaling; however, other methods may also be used. If the dialed number corresponds to a landline telephone 48, the MSC 18 may engage in ISUP signaling communications with a service switching point ("SSP") 46 to set up the call between the mobile station 50 and the landline telephone 48. When a call path is available, switches connect the call and communication begins.

The wireless network 10 ordinarily includes multiple cells, each of which can include at least one base station 14. While connected to the wireless network 10, the mobile station 50 can travel between cells 12. Generally, the mobile station 50 communicates with the nearest base station 14, which is the base station 14 of the mobile station's current cell 12. Using the nearest base station 14 can allow the mobile station 50 to receive a strong and clear signal. As the mobile station 50 travels to different cells 12, the nearest base station 14 may change. Allowing the mobile station 50 to communicate with different base stations 14 can increase its range without requiring a proportionate increase in its transmitting and receiving power. The "hand off" process of transferring base stations 14 appears transparent to the mobile station's user, and it may occur one or more times during a single call.

Different levels of service may be provided to mobile stations 50 within the wireless network 10 by creating specialized service levels. A specialized service level may be provided to a predetermined group of mobile stations 50 that subscribe to the wireless network 10. The specialized service level may be one in which access to the wireless network's resources are more controlled. A specialized service level can be assigned to a mobile station 50. The specialized service level can be used, for example, during the call initiation process to determine whether the mobile station 50 is allowed to connect to the wireless network 10.

Figure 2:
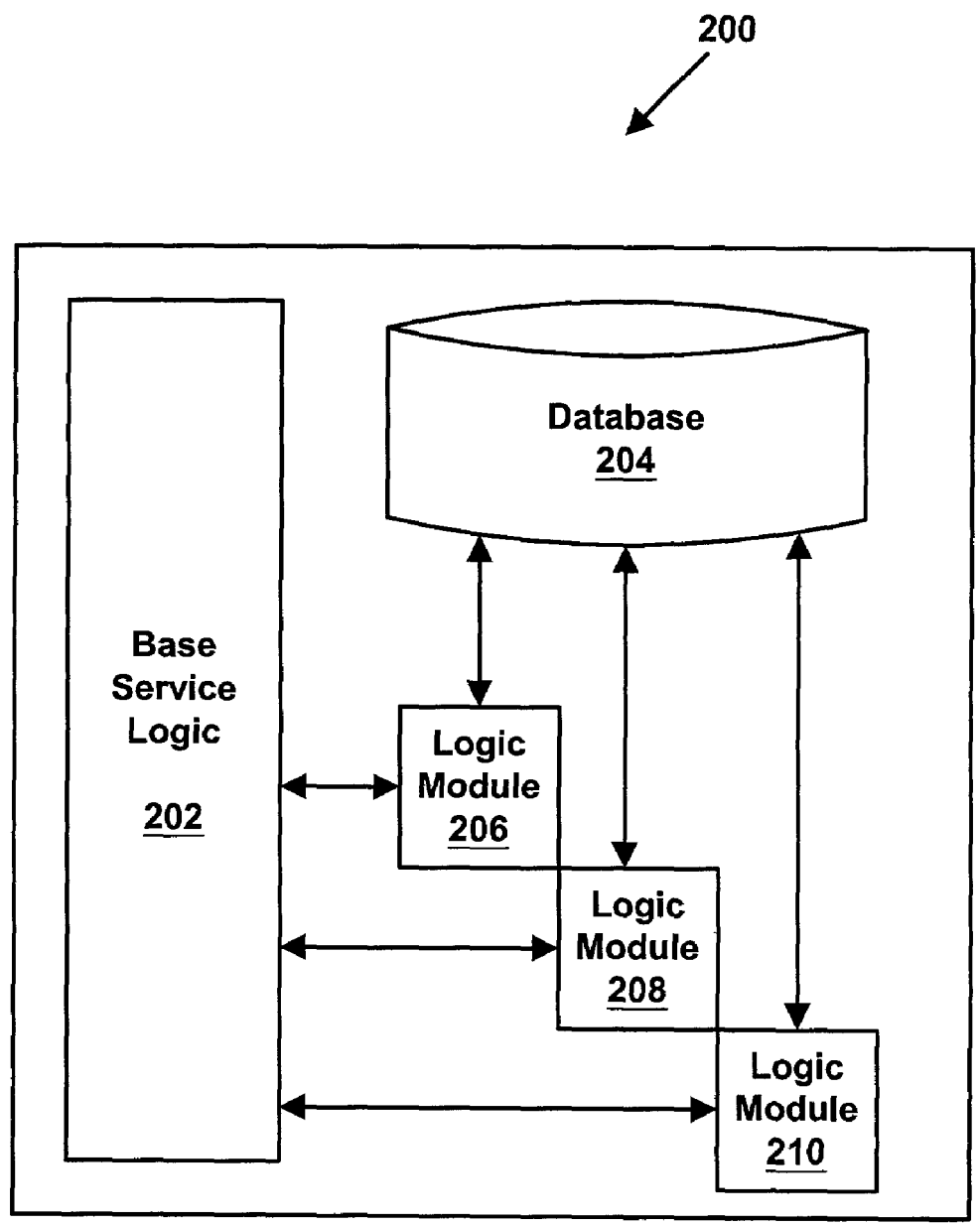
FIG. 2 is a block diagram of a controller used in a wireless telecommunications network.

A call control system, such as a service control point ("SCP"), can control the mobile station's use of the wireless network's resources. One way to implement different service levels is by using the wireless network's the call control system, such as a SCP. FIG. 2 shows a block diagram illustrating an exemplary SCP 200. In one embodiment, the controller 40 in FIG. 1 is implemented as the SCP 200. The double-headed arrows in the SCP 200 indicate the logical connections between its components.

The SCP 200 can include a number of logic modules 206, 208, 210, which can be stored in memory and executed by a processor. The SCP 200 may also include a base service logic module 202. The base service logic module 202 includes functionality for decoding and encoding messages received from and sent to the MSC 18 via the STP 38. The base service logic module 202 also includes service logic for determining what databases and logic modules to invoke in order to process the information from decoded messages. For example, the base service logic module 202 may have access to a subscriber service database 204, which stores subscriber profiles. The subscriber service database 204 may be keyed to an ESN, International Mobile Subscriber Identity ("IMSI"), or other identifier. The subscriber service database 204 may be used to implement the HLR, and it may provide additional functionality over the HLR.

A logic module 206, 208, 210 is typically associated with a service. It may be the software that specifies how to provide the service. FIG. 2 illustrates three logic modules 206, 208, 210, and the SCP 200 may contains additional or fewer logic modules. Each logic module is usually able to query the subscriber service database 204 directly and to query the base service logic module 202. To provide a given service, the base service logic module 202 can invoke the appropriate logic module as a kind of subroutine call. In particular, the base service logic module 202 passes a set of input parameters to the logic module, and the module returns a set of output parameters that the base service logic module 202 can use to encode the messages need to provide the desired service. Other implementations of the SCP 200 are also possible.

The SCP 200 may control the wireless network resources through its signaling with a call connection system, such as a MSC 18. For example, when a mobile station 50 with the specialized service level tries to originate a call, the MSC 18 may send an ORREQ request to the SCP 200. The SCP 200 may then direct the MSC 18 to either allow or deny the call, depending on whether the conditions are met. The SCP 200 may similarly either allow or deny call termination requests to mobile stations with the specialized service level. When such calls are denied, the SCP 200 may direct the MSC 18 to connect the call to a resource. For example, the resource may be a voice mail system, or the resource may play a message explaining that service is unavailable.

Alternatively, the SCP 200 may control calls involving mobile stations 50 by using the triggers. According to IS-771, which is incorporated by reference in its entirety herein, the subscriber profile can include a "TriggerAddressList" parameter. This list provides a serving system with lists of triggers and, for each list, an associated address (e.g., point code) of a network entity that provides the service control function for the triggers in the list. The triggers are commonly referred to in IS-771 parlance as "WIN_Triggers." The profile may specify that the serving system should query any designated central control point in the network (e.g., an HLR, a SCP, an intelligent peripheral, a service node or another point) for guidance at a predefined trigger point during call processing.

One type of trigger, which may be utilized, is the Wireless Intelligent Network ("WIN") "Prepaid Charging" trigger as defined in IS-826, which is incorporated herein by reference in its entirety. The use of prepaid triggers advantageously allows the SCP 200 to direct the MSC 18 to drop or redirect a call during its connection. The SCP 200 may also respond to an "all calls" trigger in mobile origination cases. Other triggers may also be used.

In another operation, the SCP 200 may monitor various other system messages. For example, the SCP 200 may use an initial RADIUS request to an Authentication, Authorization and Accounting ("AAA") server, or it may use other RADIUS messages to determine cell and sector usage information of a mobile station. In another exemplary operation, the SCP 200 may monitor Session Initiation Protocol ("SIP") messages to track cell and sector usage information of a mobile station. In yet another exemplary operation, the SCP 200 may access the AAA server in order to determine cell and sector usage by mobile stations. Alternatively, the functionality of the SCP 200 to monitor message and establish classes of service may be performed by the AAA server or by another entity within the cellular network. Other variations of monitor cell and sector usage are possible, and these may also be used.

B. Exemplary Operation

The SCP 200 may determine whether to allow or deny service to a mobile station 50 in the specialized group based, at least in part, on the call activity of the other mobile stations 50 in the specialized group. For example, each time a mobile station 50 in the specialized group becomes involved in a call, the wireless network 10 may create a call context record identifying that mobile station 50 and the service area in which that mobile station 50 is currently operating. The service area may correspond to the mobile station's current cell or sector, or it may correspond to a larger geographic area that includes the mobile station's current cell or sector. Preferably, the call context records are stored in a centralized database for convenient access. This may be, for example, the database 204 in the SCP 200, or it may be in a different location.

When the SCP 200 needs to determine whether to allow or to deny service to a mobile station 50 operating in a given service area, the SCP 200 may consult the database to determine the total number of mobile stations 50 in the mobile station's specialized group that are currently active. This may be the number currently involved in a call in that service area. The SCP 200 then compares this number to a predetermined maximum allowable number. If the number is less than the maximum allowable number, then the SCP 200 allows the call; however, if the number is greater than or equal to the maximum allowable number, then the SCP 200 denies the call.

Figure 3:
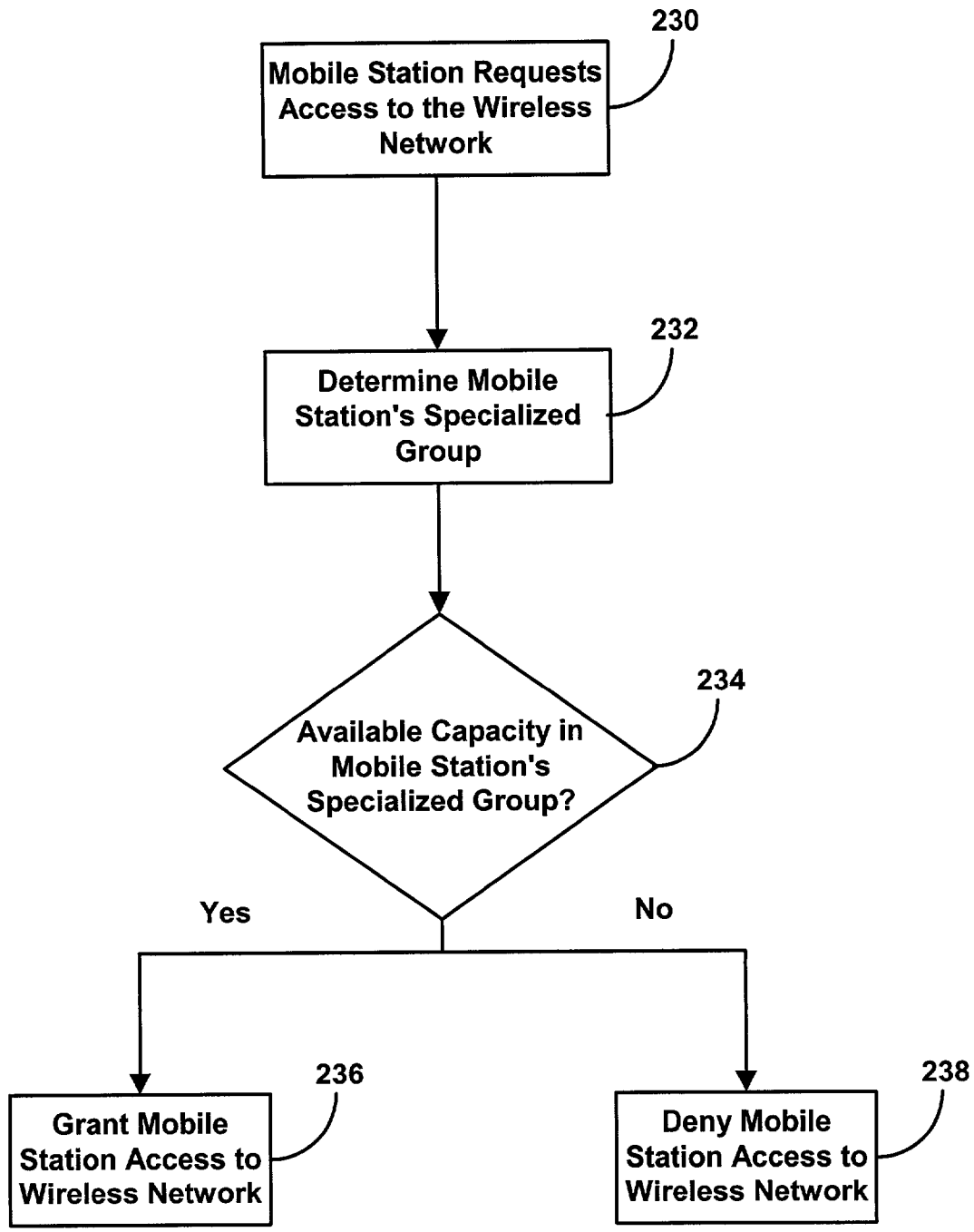
FIG. 3 is a flowchart showing an exemplary process for determining whether to add a mobile station that is a part of a specialized group of mobile stations.

FIG. 3 is a flowchart showing an exemplary process for determining whether to add a mobile station that is a part of a specialized group of mobile stations. At Step 230 the mobile station request access to the wireless network. Then, at Step 232, the wireless network determines the mobile station's specialized group. At Step 234, the wireless network determines the available capacity in the mobile station's specialized group. If the wireless network has available capacity in the mobile station's specialized group, then at Step 236 the mobile station may be granted access to the wireless network. However, if the wireless network does not have available capacity in the mobile station's specialized group, then the mobile station may be denied access to the wireless network, shown at Step 238.

The maximum allowable number may be determined using different criteria, and it may be different for different calling areas. For example, the maximum allowable number may be different for different service areas because different service areas may have different capacities. The maximum allowable number may also vary in real time. For example, the maximum allowable number may vary with the day or the time of day. It may also depend on the total load in that service area. Thus, the wireless network 10 may periodically update the maximum allowable number for each service area to account for changes in these or other factors.

In addition, because the maximum allowable number may change over time, the SCP 200 may continually monitor calls involving mobile stations in the specialized group. For example, if the maximum allowable number becomes less than or equal to the number of active mobile stations in the specialized group in that service area, the SCP 200 may direct the MSC 18 to drop or redirect one or more calls involving mobile stations in the specialized group. As previously described, the "prepaid" or other triggers allow the SCP 200 to direct the MSC 18 to drop or redirect ongoing calls.

The maximum allowable number in the specialized group may be set to a value less than the capacity of the wireless network 10. In this case, the wireless network 10 may support a number of mobile stations 50 in the specialized group up to the maximum allowable number. When the maximum allowable number is reached, the wireless network 10 can prevent additional mobile stations 50 in the specialized group from accessing the wireless network 10. However, the wireless network 10 may still have the capacity to support additional mobile stations, and it may allow mobile stations that are not part of the specialized group to access the wireless network 10.

Thus, a wireless network 10 may be able to offer specialized service levels to mobile stations 50 without placing substantial additional demands on the wireless network's resources. Moreover, the specialized service levels may be less expensive to subscribers, thereby potentially benefiting subscribers who do not need a higher level of service. The specialized service level may also allow for a higher level of service when mobile stations in the specialized group are operating in their "home" service areas. For example, the SCP may not apply the foregoing restrictions at all, or may apply them more leniently, when these mobile stations are operating in their "home" service areas. Additionally, the wireless network 10 may support more than one specialized service level.

In another embodiment, different quality of service levels may be established. Two or more different levels may be supported in the wireless network 10. For instance, when a subscriber registers for service on the wireless network 10, the subscriber may select a quality of service level. A higher quality of service may cost more, and a lower quality of service may cost less. One or more quality of service levels may also be used for smaller wireless networks that merge into larger wireless networks, or for subscribers "roaming" to the wireless network from other areas. The different service levels may also be used to support government regulations.

The quality of service levels may be used to give preferences to mobile stations with a higher quality of service level at the expense of mobile stations with lower quality of service levels. The different service levels may change the wireless network's operation during congested conditions, although they may be used to provide other thresholds for connections that are unrelated or only partially related to the wireless network's current available capacity. Four primary cases may be used to illustrate how the wireless network 10 services mobile stations 50 with different quality of service levels; however, it should be understood that additional cases are also possible and this list is not exclusive.

In one case, the wireless network 10 is not congested. It has the capacity to service both lower quality of service and higher quality of service mobile stations. Therefore, no differentiation is made between mobile stations of different service levels based on the capacity of the wireless network 10, but the quality of service levels may be used to accept or deny an access request based on other factors. For instance, the mobile station 50 may not be allowed to connect because, regardless of the current available capacity, mobile stations 50 at that service level are not allowed access at that time.

Figure 4:
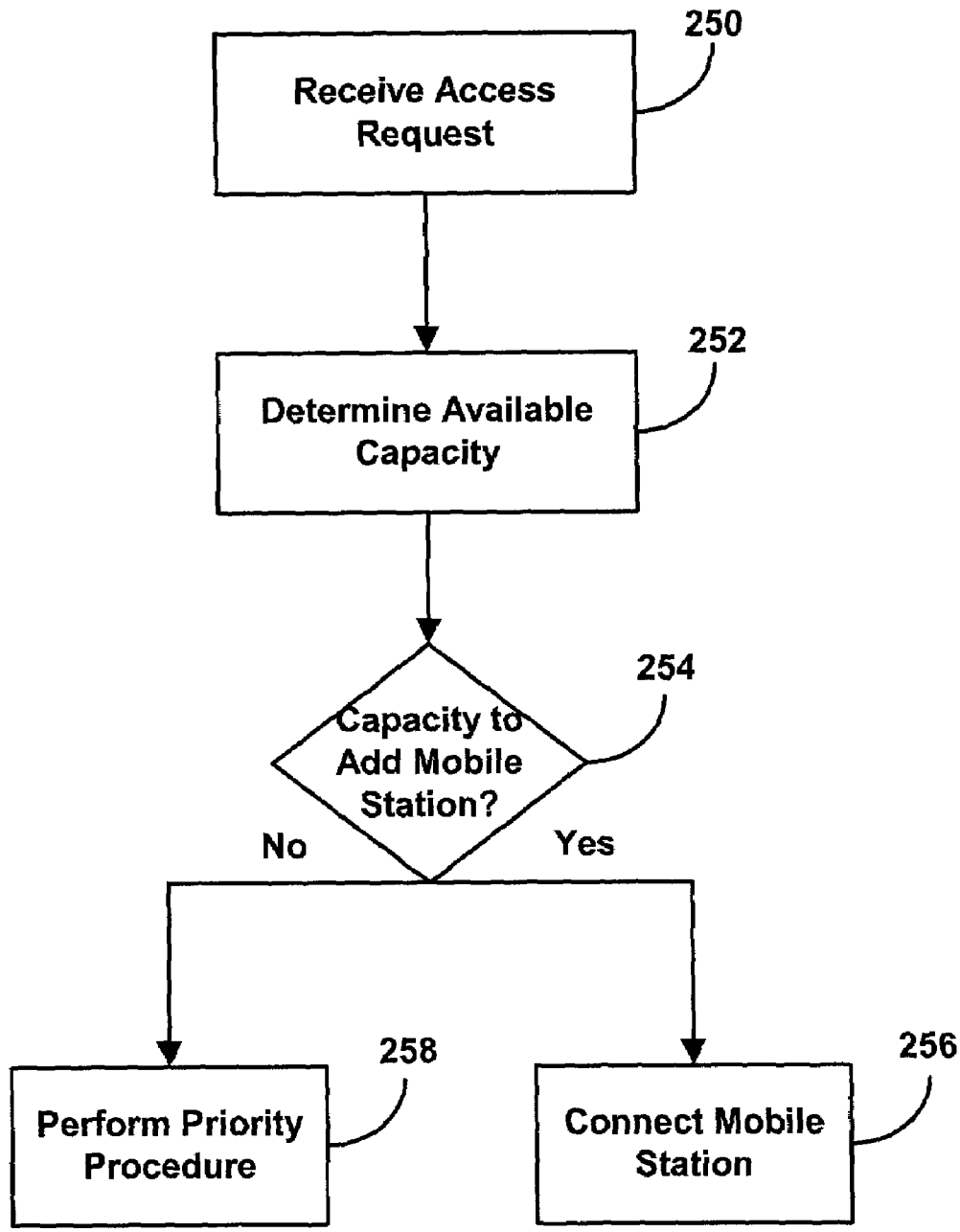
FIG. 4 is a flowchart of the connection process in a wireless telecommunications network supporting priority levels.

FIG. 4 shows a flowchart illustrating one embodiment of this process. At Step 250 the wireless network 10 receives a request from the mobile station 50 to access the wireless network 10. The wireless network 10 then determines the available capacity, shown at Step 252. The available capacity may be determined in a variety of different ways. For example, the wireless network 10 may define a predetermined maximum number of mobile stations, and the wireless network 10 may have available capacity if the number of mobile stations 50 currently accessing the wireless network 10 is less than the predetermined maximum number. Of course, other ways also exist to determine the available capacity. Then, based on the available capacity, the wireless network 10 decides whether it can support another mobile station 50, shown at Step 254. If the wireless network 10 can support another mobile station 50, the access request is granted and the mobile station 50 is connected, shown at Step 256. If, however, the wireless network 10 cannot support another mobile station 50, the wireless network 10 engages in a priority procedure, shown at Step 258, which will be described in more detail later.

In the second case, the wireless network 10 is congested, and there is little or no available capacity to add additional mobile stations 50. The wireless network 10 maintains a database of mobile stations' priorities. This may be based on their MINs, ESNs or other identifiers. One way to create the database is to partition the VLR or HLR, and to store an additional priority value. For instance, the information may be stored in the subscriber profile database 42 as a part of the controller 40 operating as an HLR. That priority information may also be transferred to and stored in a VLR, which may be a part of the database 22 connected to an MSC 18. Separate priority databases may also be used. These may be stored in the controller 40 or the MSC 18, or they may be stored in a different location or a combination of locations. Preferably, the priorities are determined during service activation and stored in the database; however, the assignment could occur at different times.

When the mobile station 50 tries to access the wireless network 10 and request resources through an access channel, the BSC 16 may use the Radio Resource Manager, or another system, to determine if there is enough capacity to support that mobile station 50. If there is enough capacity, then the mobile station 50 is granted service and the database (HLR, VLR or other) updates its list of active mobile stations. If there is no available capacity, then the BSC 16 first verifies if the requesting mobile station 50 has a higher priority than one or more other active mobile stations. If there are one or more other mobile stations with a lower priority, then the BSC 16 sends termination message to one or more of the other lower-priority mobile stations. The MSC 18 can also use other mechanisms to drop the call, such as WIN prepaid triggers. For example, the CallControl-Directive operation, as defined in IS-826, can be used to disconnect an active call. Terminating a lower priority mobile station can free the additional capacity required to support the higher priority mobile station's call. Once the lower priority mobile station is dropped, the higher priority mobile station's request for service is processed. The BSC 16 working in conjunction with the MSC 18 can then allocate the available resources to the requesting mobile station 50 and complete the requesting mobile station's call. If there are no lower priority mobile stations 50 in the system, then the wireless network 10 may block the requesting mobile station's call.

Figure 5:
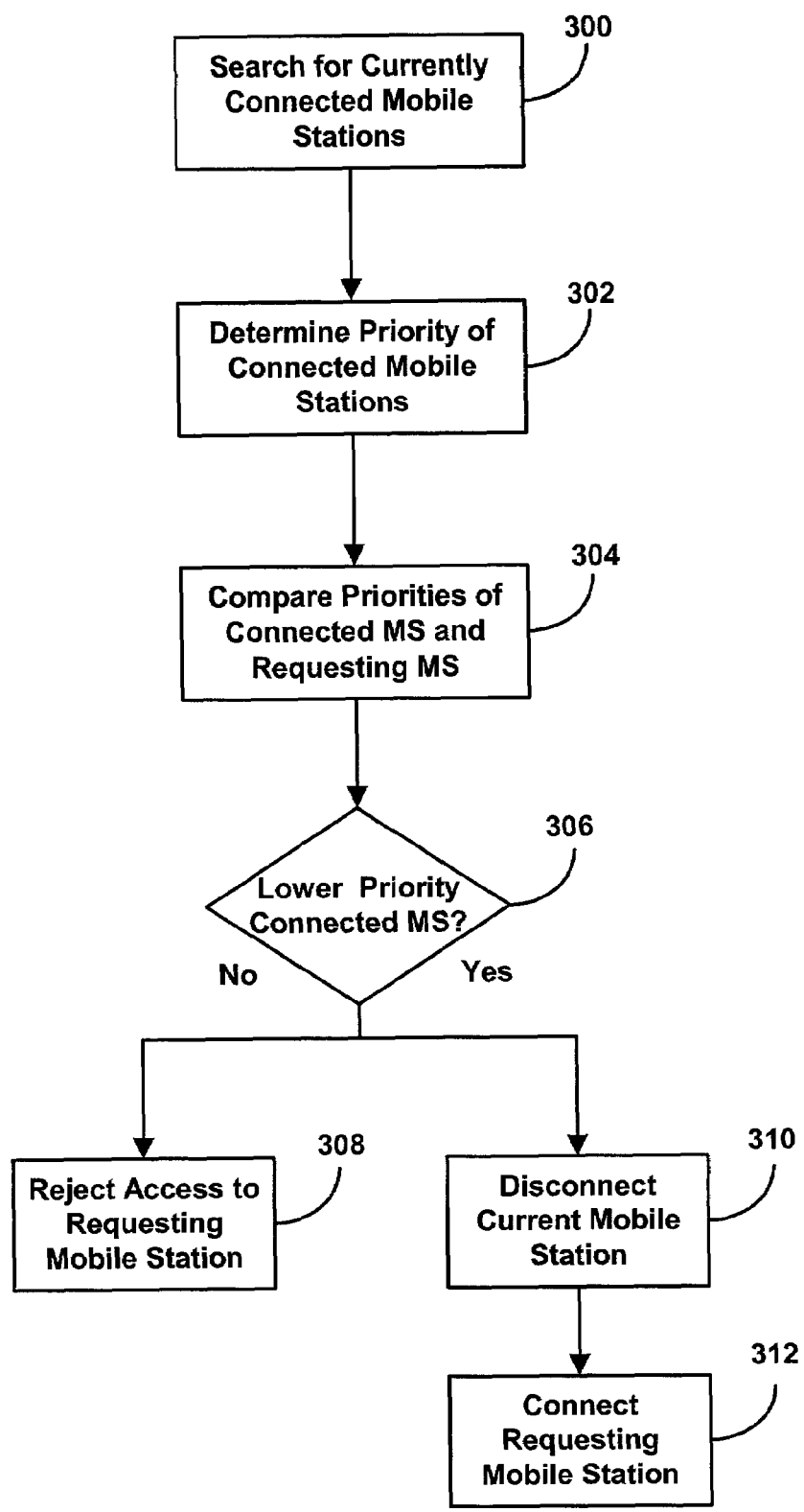
FIG. 5 is a flowchart for connecting a mobile station in a priority wireless telecommunications network that does not have the current capacity to support an additional mobile station.

FIG. 5 details a flowchart describing one embodiment for connecting a mobile station 10 in a priority wireless network 10 where the wireless network 10 does not have the current capacity to support an additional mobile station 50. This procedure may be, for instance, the priority procedure described in Step 258 of FIG. 4.

At Step 300 the wireless network 10 searches for currently connected mobile stations. This may be done, for instance, by searching the HLR, VLR or another database. For example, the wireless network 10 may maintain a real-time database that includes information about current network usage. The real-time database may include information such as which MINs are actively engaged in calls and the sector or cell of the active call. Next, the wireless network 10 determines the priority of currently connected mobile stations, shown at Step 302. The priorities of currently connected mobile stations are compared against the priority of the requesting mobile station 50, shown at Step 304. At Step 306 the wireless network 10 determines if a connected mobile station has a lower priority than the requesting mobile station 50. If the connected mobile station has a lower priority than the requesting mobile station 50, the lower priority mobile station is disconnected from the wireless network, shown at Step 310. Disconnecting the lower priority mobile station 50 can free the additional capacity needed to connect the requesting mobile station 312. If, however, there are no mobile stations with a lower priority than the requesting mobile station 50, the access request is rejected, shown at Step 308, and the requesting mobile station 50 is not connected to the wireless network 10.

The flowchart in FIG. 5 details one possible implementation of a priority system. Other modifications are possible. For instance, the wireless network 10 may search for the first mobile station it finds with a lower priority than the requesting mobile station 50. The lower priority mobile station 50 is then disconnected to free the capacity needed to connect the higher priority, requesting mobile station 50. In another embodiment, the wireless network 10 searches through all connected mobile stations to find the mobile station with the lowest priority. That lowest priority mobile station is then disconnected to make room for the higher priority, requesting mobile station 50. In yet another embodiment, the wireless network 10 searches until it finds the first mobile station with the lowest possible priority. After finding the first mobile station with the lowest possible priority, that mobile station is disconnected and the higher priority mobile station 50 is connected. Many other variations are also possible.

In the third case, the wireless network 10 has capacity for only one mobile station 50, and two mobile stations (one with a low priority and one with a higher priority) try to access the network at the same time or close to the same time. If the access requests are close enough, then the wireless network 10 can "simultaneously" consider the access requests. Using the priority database, the service logic compares the priority of the two requesting mobile stations. The wireless network 10 provides service to the higher priority requesting mobile station, and the lower priority requesting mobile station is not granted service. In an SCP 200 controlled system, after the priorities have been compared, information may be sent to the MSC 18 regarding the continuation or special treatment of the session. For example, the MSC 18 may receive information regarding continuing the session, disconnecting the session, sending an announcement frame or other information.

In the fourth case, a higher priority mobile station 50 is already connected. The mobile station 50 then moves from one cell/sector to another, therefore requiring a handoff. If the new cell/sector has the capacity to handle the transferred call, then the handoff occurs normally. If there is no capacity available in the new cell/sector, then the controller 40 may determine, via service logic, the priority of the call. This information may be relayed to the MSC 18, which can then use the previously described mechanism to drop a lower priority mobile station and connect the higher priority mobile station 50.

Figure 6:
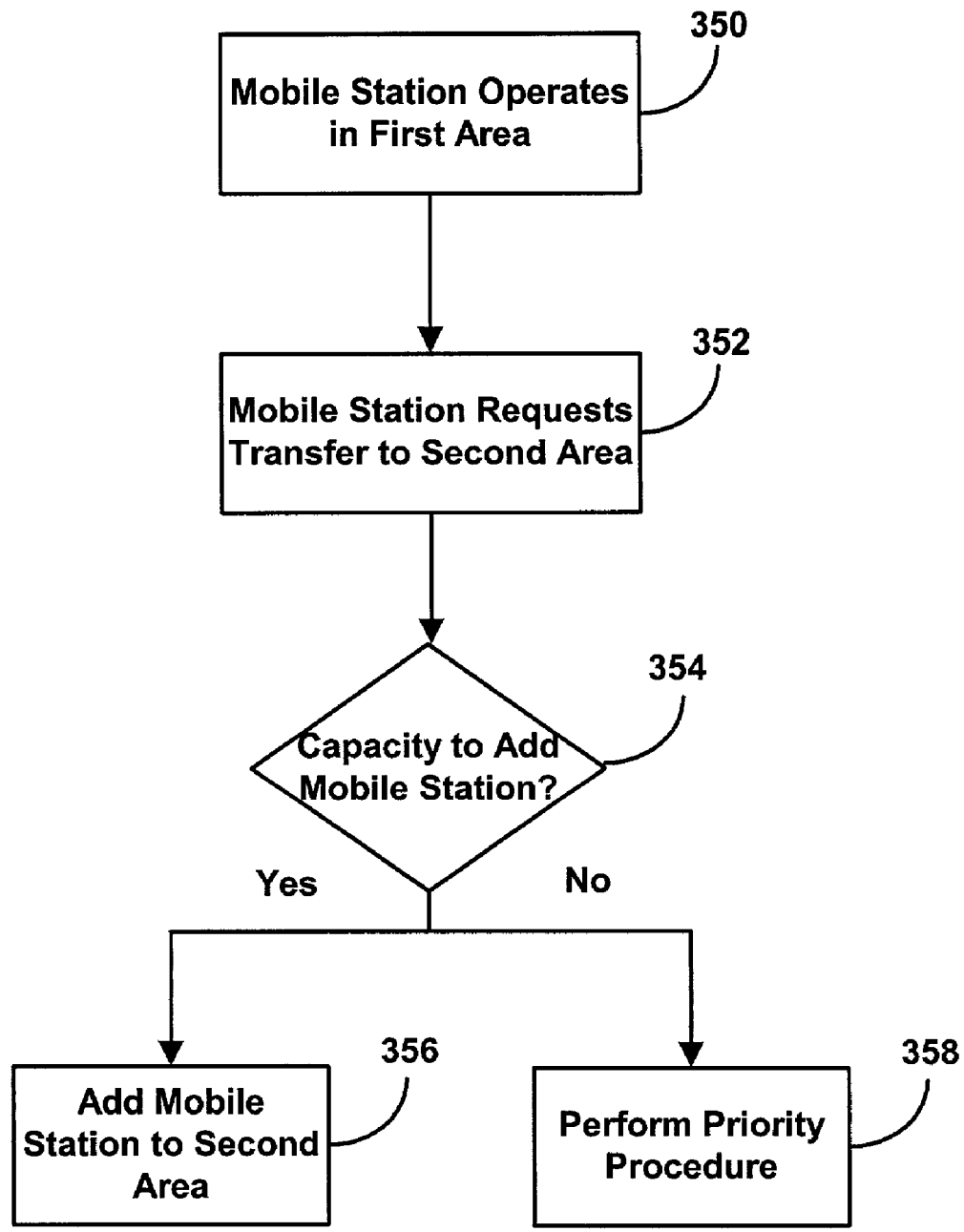
FIG. 6 is a flowchart of an exemplary process for a mobile station hand off in a wireless network that supports priority levels.

FIG. 6 is a flowchart of an exemplary process for a mobile station 50 handing off. At Step 350, the mobile station 50 operates in a first area, such as a cell 12. At Step 352, the mobile station 50 requests a transfer to a second area, such as a different cell 12. A control entity in the second area determines if the second area has the capacity to connect the mobile station 50, shown at Step 354. If the second area has the capacity to connect the mobile station 50, and if the mobile station's service level allows it to connect to the second area, then the mobile station 50 can be added to the second area, shown at Step 356. However, if the second area does not have the capacity to add the mobile station 50, then the second area can perform a priority procedure to determine whether to drop another mobile station operating in the second area in order to free the additional capacity to add the mobile station 50 from the first area, shown at Step 358.

An exemplary embodiment of the present invention has been described above. Those skilled in the art will understand, however, that changes and modifications may be made to this embodiment without departing from the true scope and spirit of the present invention, which is defined by the claims.

We claim:

1. A method of providing a specialized service level in a wireless telecommunications network, the method comprising:
    defining a predetermined group of mobile stations, the predetermined group of mobile stations being a subset of mobile stations subscribing to the wireless telecommunications network;
    receiving a call request to set up a call involving a given mobile station in the predetermined group of mobile stations, the given mobile station operating in a current service area in which an active number of mobile stations in the predetermined group are currently involved in calls, wherein the current service area is defined by at least one wireless coverage area of the wireless telecommunications network;
    determining the current service area of the given mobile station;
    determining the active number; and
    allowing the call request if the active number is less than a predetermined maximum number.

2. The method of claim 1, further comprising:
    denying the call request if the active number is not less than the predetermined maximum number.

3. The method of claim 1, wherein the current service area is other than a home service area of the given mobile station.

4. The method of claim 1, wherein the call request is a call origination request from the given mobile station.

5. The method of claim 1, further comprising:
    identifying each mobile station that is both currently involved in a call and in the predetermined group of mobile stations as an active mobile station;
    maintaining a call context record for each one of the active mobile stations, the call context record identifying the one of the active mobile stations and a current service area in which the one of the active mobile stations is operating.

6. The method of claim 5, further comprising:
    disconnecting at least one mobile station that is both currently involved in a call and in the predetermined group of mobile stations as an active mobile station; and
    allowing the call request.

7. A system for providing a specialized service level to a predetermined group of mobile stations, the predetermined group of mobile stations being a subset of mobile stations subscribing to a wireless telecommunications network, the system comprising:
    a database, the database including call activity data, the call activity data specifying how many mobile stations in the predetermined group of mobile stations are currently involved in calls in each service area in the wireless telecommunications network, wherein each service area is defined by at least one wireless coverage area of the wireless telecommunications network;
    a call connection system for connecting calls in the wireless telecommunications network; and
    a call control system controlling the call connection system, the call control system controlling, based at least in part on the call activity data in the database, use of resources of the wireless telecommunication network by the mobile stations in the predetermined group of mobile stations.

8. The system of claim 7, wherein the database contains an identifier indicating which mobile stations listed in the database are part of the predetermined group of mobile stations.

9. The system of claim 7, wherein the database contains a visitor location register.

10. The system of claim 8, wherein the database contains a home location register.

11. A method for implementing quality of service levels during a handoff comprising the steps of:
    receiving a handoff request from a mobile station to handoff from a first wireless coverage area in a wireless telecommunications network to a second wireless coverage area in the wireless telecommunications network;
    determining a priority of the mobile station, wherein the priority defines a subset of mobile stations allowed to access the second wireless coverage area;

determining an active number of mobile stations in the second wireless coverage area that are currently involved in calls and have the priority; and allowing the handoff request if the active number is less than a predetermined number.

12. The method of claim 11, further comprising:

denying the handoff request if the active number is not less than a predetermined number.

13. The method of claim 11, further comprising:

identifying at least one lower priority mobile station currently accessing the second wireless coverage area, wherein the at least one lower priority mobile station has associated with it a second priority; and wherein the second priority defines a second subset of mobile stations allowed to access the second wireless coverage area;

disconnecting the at least one lower priority mobile station from the second service area; and allowing the handoff request.

* * * * *